(12) United States Patent
Akester et al.

(10) Patent No.: US 6,324,274 B1
(45) Date of Patent: Nov. 27, 2001

(54) METHOD AND SYSTEM FOR MANAGING A USER PROFILE FOR USE IN A PERSONAL NUMBER SERVICE

(75) Inventors: Richard J Akester, Ipswich; Paul McDonald, Flixstowe, both of (GB)

(73) Assignee: British Telecommunications public limited Company, London (GB)

( * ) Notice: Subject to any disclaimer, the term of this patent is extended or adjusted under 35 U.S.C. 154(b) by 0 days.

(21) Appl. No.: 09/051,115

(22) PCT Filed: Mar. 21, 1997

(86) PCT No.: PCT/GB97/00803

§ 371 Date: Apr. 1, 1998

§ 102(e) Date: Apr. 1, 1998

(87) PCT Pub. No.: WO97/37499

PCT Pub. Date: Oct. 9, 1997

(30) Foreign Application Priority Data

Mar. 29, 1996 (EP) .................................. 96302282

(51) Int. Cl.[7] .............................. H04M 3/42; H04M 7/00
(52) U.S. Cl. .................... 379/201.02; 379/201.07; 379/201.1; 379/207.12; 379/221.08; 379/913
(58) Field of Search .................... 379/219, 220, 379/230, 231, 233, 265, 309, 201.02, 201.06, 201.07, 201.1, 207.12, 220.01, 221.08, 265.01, 265.02, 913

(56) References Cited

U.S. PATENT DOCUMENTS 5,436,965 * 7/1995 Grossman et al. ............... 379/265 X

FOREIGN PATENT DOCUMENTS

| 44 20 462 | 12/1995 | (DE) | H04M/3/42 |
| 484 067 | 5/1992 | (EP) | H04M/3/42 |
| 637 159 | 2/1995 | (EP) | H04M/3/42 |
| 92 09164 | 5/1992 | (WO) | H04M/3/00 |

OTHER PUBLICATIONS

International Switching Symposium, vol. 1, Apr. 24. 1995, Berlin, DE, Tabanne et al, "An intelligent location tracking method for personal and terminal FPLMTS/UMTS communications".

* cited by examiner

Primary Examiner—Harry S. Hong
(74) Attorney, Agent, or Firm—Nixon & Vanderhye P.C.

(57) ABSTRACT

A user profile for use, for example in a personal numbering service, has an associated confidence value for each of the destination terminal numbers in the profile, a confidence value representing the confidence of a call being successfully answered at the associated network terminal. When a service using the profile needs to route a call for a user, the corresponding profile is accessed and the call is routed to the destination terminal number having the highest confidence value. The profile is managed to modify the confidence values depending upon the outcome of the call, and also upon registration of a personal number user at a network terminal. The confidence values are probabilities and when one confidence value is increased because of a successful outcome, the other values are adjusted. The confidence values can be a function of time to represent lessening confidence that a user is still at the network terminal of his last registration.

32 Claims, 6 Drawing Sheets

METHOD AND SYSTEM FOR MANAGING A USER PROFILE FOR USE IN A PERSONAL NUMBER SERVICE

BACKGROUND OF THE INVENTION

1. Field of the Invention

This invention relates to the routing of calls in communications networks, and particularly, but not exclusively, to a method and a system for managing a user profile for use in a personal number service.

2. Description of Related Art

It has been proposed to provide a personal number service in which users of the service (personal number users (PNUs)) have a personal number (PN) and wherein a call made to a PNU by dialling the PN will be routed by the network to the network destination terminal at which the PNU has indicated that he (or she, but conventionally referred to as a male hereinafter) wants to receive his PN calls.

A simple Personal Numbering service known as "CallMe" (trade mark) is provided by VODAFONE GROUP PUBLIC LIMITED COMPANY, referred to as a service provider or service operator, in which a PNU is given a PN, and it is the PNU's responsibility to register with the service provider his identity in association with the network terminal at which he wishes to be reached. This is done by the PNU making a call to the CallMe service, entering his PN, a security personal identification number (PIN) and the relevant destination terminal number (DTN), also referred to as the telephone number. This procedure is known as user registration.

Another personal numbering service known as "Personal Assistant" (trade mark) has been announced by Telecom Securicor Cellular Radio Limited, trading as Cellnet. In this service, a PNU has a user-associated profile which is personal to him and by means of answering a questionnaire he can predetermine a number of periods in the day and respective destination terminal numbers to which incoming calls to that user's network terminal are to be diverted by the network. For example, the PNU may have defined his profile for a weekday pattern of 0730 to 0830 Divert to voice messaging service (e.g. Voicebank (trade mark)), 0830 to 1830 Accept calls to office telephone number, 1830 to 1930 Divert to voice messaging service, and 1930 to 2100 Accept calls to home telephone number.

When the PNU defines his profile in the CallMe service, he prioritises the destination terminal numbers so that when attempting to locate the PNU the service will try the destination terminal number designated by the PNU for that period, and if the PNU is not found, the service proceeds to try the other destination terminal numbers in the profile in their order of priority.

The Personal Assistant service cannot cope with changes in the PNU's pattern of usage, For example, if the PNU has gone home early, calls will continue to be connected to the office telephone. In order to change the profile, the PNU will have to supply amended details using a questionnaire reply procedure, as before.

DE-A-4 420 462 discloses, in addition to a known user profile in the form of a call forwarding list arranged in priority order and to a known simple registration arrangement, an automatic registration arrangement wherein the user possesses an identification card carrying identity information. When the user comes within range of a sensor in a telephone, the sensor receives signals from the card and passes the identity information to a device, also in the telephone, which generates a log-on message containing the identity information and sends it to the service operator. When the user moves out of range, the sensor causes the device to generate and send a log-off message. If the user is currently registered at a telephone, a call for the user is routed to that telephone, but if the user is not currently registered at any telephone then a call for the user is routed to the user's mobile telephone, which, in known manner, is the first choice destination for routing calls to the user.

DE-A-4 420 462 also discloses an arrangement for an office environment, in which a plurality of telephones, each having a sensor but not having a device for generating and sending messages, are connected in series such that a call to a user is always sent to the first telephone of the series, and each telephone automatically routes the call to the next telephone in the series unless automatic routing is overridden by the user being currently sensed at a telephone. This arrangement avoids the use of a user profile containing a sequence of numbers. The switching system for the office only knows the number of the first telephone of the series.

EP-A-0 637 159 discloses an arrangement in which, if the user has authorised a call sequencing feature in connection with a set of call forwarding numbers which the user has ranked in order of priority, a caller receives an announcement that call sequencing is available. Thus, in the event that the caller wishes to make another attempt to contact the user after failing at the first call forwarding number, the caller keys a code, "*#", and the arrangement responds by making a call to the second call forwarding number, and so on.

WO-A-92 09164 discloses an automatic call distributor (ACD) in which telephony information, e.g. the Basic Rate Interface and the Dialled Number Identification Service of a call incoming to the ACD, is used to select one of a number of application programs (sales, service, support), each having a respective set of agents. Selection of an application program may also involve the area code of the calling number. The ACD maintains a set of performance data (statistics) on the agents, which is used in selecting an agent to answer the call. In one example, the total sales made by each agent is monitored and a call is directed to the agent who has made the most sales in given period. In other examples, the average time spent by each agent per call is monitored and a call is directed to the agent having the lowest (or highest) average time values. Other quantitative agent selection values, not necessarily criteria relating to the performance of the agents, can be used to decide to which of the available agents a call is to be routed, including an assigned agent performance ranking, and the amount of time that an agent has been ready to receive a call. The selection values can be chosen so as to guarantee that a new agent is not receiving too many calls, even if he might be achieving high total sales or low times per call.

In the above known arrangements having profiles, any updating of the profile is on the basis of prior knowledge of the called user's intended or actual new location, either declared to the service provider via a profile change procedure or known to the service provider via a registration process. This requires a positive action by the called user, and any failure in this will result in a mismatch between the profile and the terminal to which the called user wishes an incoming call to be delivered. Such failures can be, for example, the called user forgetting to initiate the profile change procedure or the registration process, or not carrying the above-mentioned identification card, or a failure of the identification card sensing system.

SUMMARY OF THE INVENTION

According to a first aspect of the present invention there is provided a method of managing a user profile system comprising a plurality of user-associated profiles, each profile storing for a respective associated user a plurality of destination terminal numbers, the user profile system being for use for determining the routing in a network of a call for which a said respective associated user associated with a said profile is one of the parties of said call, the method comprising the steps of:

storing, in each of said user profiles, a respective confidence value in association with each of said destination terminal numbers, each respective confidence value representing the confidence that a call to the destination terminal corresponding to the associated destination terminal number will have a predetermined outcome;

selecting, for use by the network in routing said call, a destination terminal number from the said profile on the basis of the highest confidence value;

modifying at least one of said respective confidence values of the said profile on the basis of the actual outcome of a call routed to the destination terminal corresponding to the selected destination terminal number.

The present invention dynamically manages the confidence values of the profile on the basis of the actual outcome of calls, and this obviates the need of the user to take any updating action as is performed in the above prior disclosures and thus avoids any mismatch arising from the failure of the user-initiated update process. The confidence values are dynamically controlled and follow, in one application, the movement behaviour of a PNU (the profile in this case being called user-associated), or, in another application, the enquiry behaviour of, say, an account-holding customer of a department store (the profile in this case being calling user-associated).

Thus, for a called user-associated user profile system, PNUs are not required by the service provider to supply new questionnaires, or to amend their existing questionnaires, to take into account any relatively long term change in their pattern of movement. Indeed, a PNU need not supply an initial questionnaire, because the profile system modifies the confidence values of the PNU's profile on a call-by-call basis and can generate these confidence values from actual call outcomes. This modification is, in one form, fully automatic, requiring no action by the PNU, by deeming any answer at the corresponding destination terminal to have reached the PNU successfully, and is, in another form, semi-automatic, requiring the person who answers the call to indicate the outcome, namely whether the call was answered by the PNU, or on behalf of the PNU.

And, correspondingly, for a calling user-associated user profile system, a caller, for example a customer of a departmental store, is not required to supply updating information to the store, nor, indeed, to supply any initial information, since the profile system will adapt the confidence values on a call-by-call basis from the outcome of the calls as determined by the person who answered the call at the corresponding destination terminal, which in this case is associated with a function of the store, e.g. a support function.

Preferably, when said respective associated users are called users and said predetermined outcome is the answering of said call by a person at said corresponding destination, the modifying step comprises the substeps of determining, on the basis of the actual outcome of a call routed to the destination terminal corresponding to the selected destination terminal number, a measure of the achievement of said predetermined outcome; and changing said at least one of said respective confidence values on the basis of said determined measure.

Alternatively, when said respective associated users are called users and when said predetermined outcome is the answering of said call by the called user at said corresponding destination terminal, the modifying step comprises the substeps of determining, on the basis of information indicative of said actual outcome provided by a person answering a call routed to said corresponding destination terminal, a measure of the achievement of said predetermined outcome, and changing said at least one of said respective confidence values on the basis of said determined measure. In this case, the information may be indicative of the call having been answered on behalf of the called user.

Said determined measure may be representative of at least partial achievement of said predetermined outcome, and said changing substep comprise increasing the confidence value associated with said selected destination terminal number. Additionally, or alternatively, said changing substep comprises decreasing the respective confidence values associated with at least one of the destination terminal numbers other than said selected destination terminal number.

Preferably, when abandonment of said call to said corresponding destination terminal before answer constitutes non-achievement of said predetermined outcome, said changing substep comprises decreasing the respective confidence value associated with said selected destination terminal number.

Preferably, when said respective associated users are calling users, for each profile, the stored destination terminal numbers are associated with respective different functions of a called user, and said predetermined outcome is a match between the function sought by an enquiring calling user and the function associated with the selected destination terminal number, the modifying step comprises the substeps of determining by a person answering said call at said corresponding destination terminal the likelihood that the calling user will not need to make a further call to that function, said determination constituting said actual outcome, and changing said at least one of said respective confidence values on the basis of said actual outcome.

In this latter case, i.e. when said respective associated users are calling users, said changing substep preferably comprises decreasing the respective confidence value associated with said selected destination terminal number, and more preferably comprises increasing the respective confidence values associated with at least one of the destination terminal numbers other than said selected destination terminal number.

Other than when the calling user abandons the call, preferably said actual outcome is provided by sending a signal to the user profile system from said corresponding destination terminal.

According to a second aspect of the present invention there is provided a user profile system for determining the routing in a network of a call for which a user associated with a profile of the system is one of the parties of said call; the user profile system comprising:

a plurality of user-associated profiles, each profile being arranged for association with a respective user and comprising a respective first storage means for storing a plurality of destination terminal numbers, and a respective second storage means for storing a corresponding plurality of associated confidence values representing the respective confidences that calls to the destination terminals corresponding to said destination terminal numbers will have a predetermined outcome;

selection means responsive to the occurrence of a call for which said user is one of the parties of the call to select from the profile associated with said user, for use by the network in routing said call, the destination terminal number having the highest confidence value; and modification means arranged to modify at least one of said respective confidence values on the basis of the actual outcome of said call routed to the destination terminal corresponding to the selected destination terminal number.

In a system for use when said respective associated users are called users and when said predetermined outcome is the answering of said call by a person at said corresponding destination, preferably said modification means is constituted by means arranged to determine, on the basis of the actual outcome of said call routed to the destination terminal corresponding to the selected destination terminal number, a measure of the achievement of said predetermined outcome, and means arranged to change said at least one of said respective confidence values on the basis of said determined measure.

Alternatively, in a system for use when said respective associated users are calling users and, for each profile, the stored destination terminal numbers are associated with respective different functions of a called user, and said predetermined outcome is a match between the function sought by an enquiring calling user and the function associated with the selected destination terminal number, preferably said modification means is constituted by means arranged to receive a signal indicative of the likelihood that the calling user will not need to make a further call to that function and to provide in response thereto said determined measure, and means arranged to change said at least one of said respective confidence values on the basis of said determined measure.

In this alternative system, preferably said changing means is arranged to decrease the respective confidence value associated with said selected destination terminal number.

Preferably, said changing means is also arranged to increase the respective confidence values associated with at least one of the destination terminal numbers other than said selected destination terminal number.

In a system of this second aspect of the present invention, for use when said respective associated users are called users and when said predetermined outcome is the answering of said call by the called user at said corresponding destination, preferably the modification means is constituted by means arranged to determine, on the basis of information indicative of said actual outcome provided by a person answering a call routed to said corresponding destination terminal, a measure of the achievement of said predetermined outcome, and means arranged to change said at least one of said respective confidence values on the basis of said determined measure.

Preferably, in a system as defined in the preceding paragraph, said determining means is arranged to respond to receipt of information indicative of the call having been answered on behalf of the called user, to provide a said determined measure corresponding to partial achievement of said predetermined outcome.

Preferably, in a system of this second aspect of the present invention, said changing means is arranged to increase the confidence value associated with said selected destination terminal number in response to a said determined measure representative of at least partial achievement of said predetermined outcome.

More preferably, in a system of this second aspect of the present invention, said changing means is arranged to decrease the respective confidence values associated with at least one of the destination terminal numbers other than said selected destination terminal number in response to a said determined measure representative of at least partial achievement of said predetermined outcome.

In a system of this second aspect of the present invention, for use when said respective associated users are called users and when said predetermined outcome is the answering of said call by the called user at said corresponding destination, more preferably said determining means is responsive to the abandonment of said call to said corresponding destination terminal before answer to provide a determined measure corresponding to non-achievement of said predetermined outcome, and said changing means is arranged to decrease the confidence value associated with said selected destination terminal number.

BRIEF DESCRIPTION OF THE DRAWINGS

Specific embodiments of the present invention will now be described by way of example with reference to the drawings in which.

DESCRIPTION OF THE INVENTION

Figure 1:
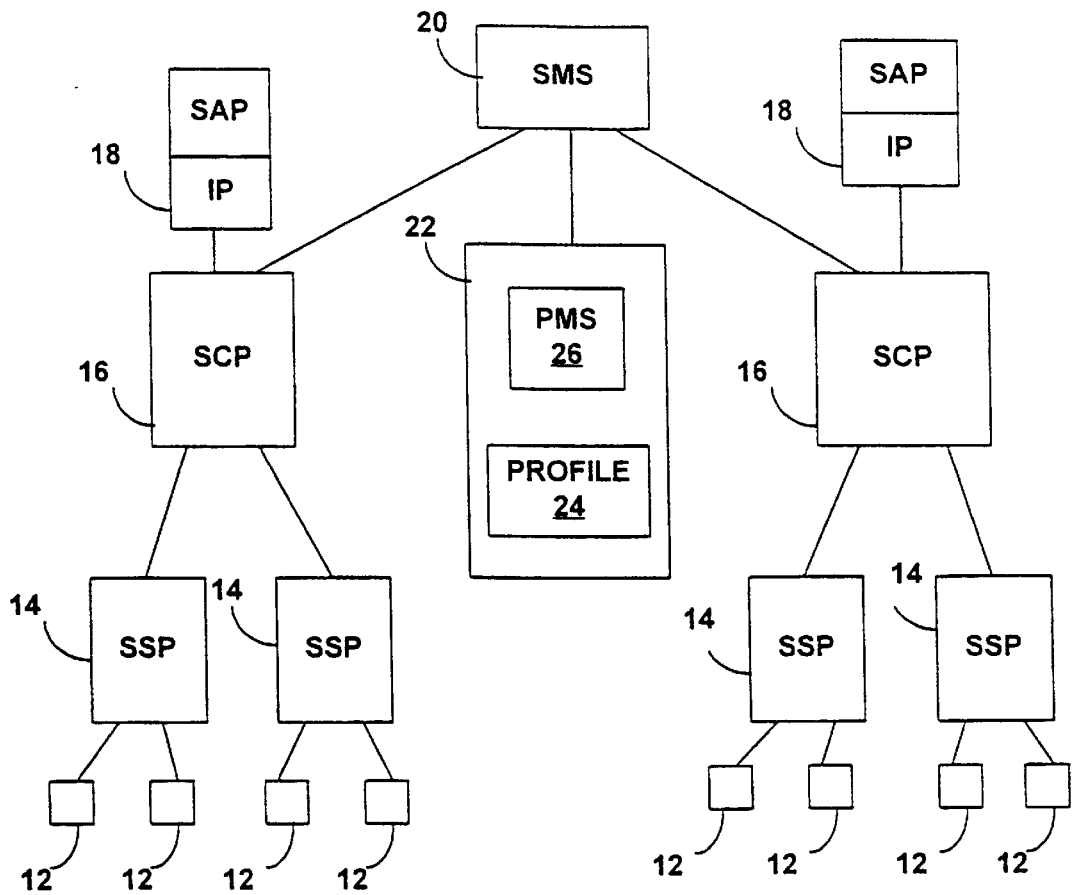
FIG. 1 shows a first form of the present invention embodied in a conventional intelligent network.

In FIG. 1 there is shown a conventional intelligent network 10 comprising network terminals 12, service switching points (SSPs) 14, service control points (SCPs) 16 with associated intelligent peripherals (IPs) 18, and a service management system (SMS) 20. In addition, the network 10 includes a specialised database system (SDS) 22 connected to each SCP 16 and to the SMS 20.

In this description, the terms "telephone" and "terminal" are used interchangeably.

In accordance with the present invention, the SDS 22 contains respective user profiles 24 for users of a personal numbering service (PNS), and a profile management system (PMS) 26 which will be described in detail later.

When a calling user wishes to make a call to a personal number user (PNU), the call is originated in the conventional manner at one of the network terminals 12, hereinafter referred to as the source terminal, by the calling user requesting service and dialling the personal number (PN) of the desired PNU.

The call request details are received at the associated SSP 14 and routed to its associated SCP 16, which in turn makes a request of the SDS 22 for the current actual destination terminal number (DTN) corresponding to the PN. The PMS 26 in the SDS 22 responds to the request from the SCP 16 to interrogate the user profile corresponding to the received PN, and to determine a DTN for the SDS 22 to pass back to the SCP 16 for completion of the call.

Figure 2:
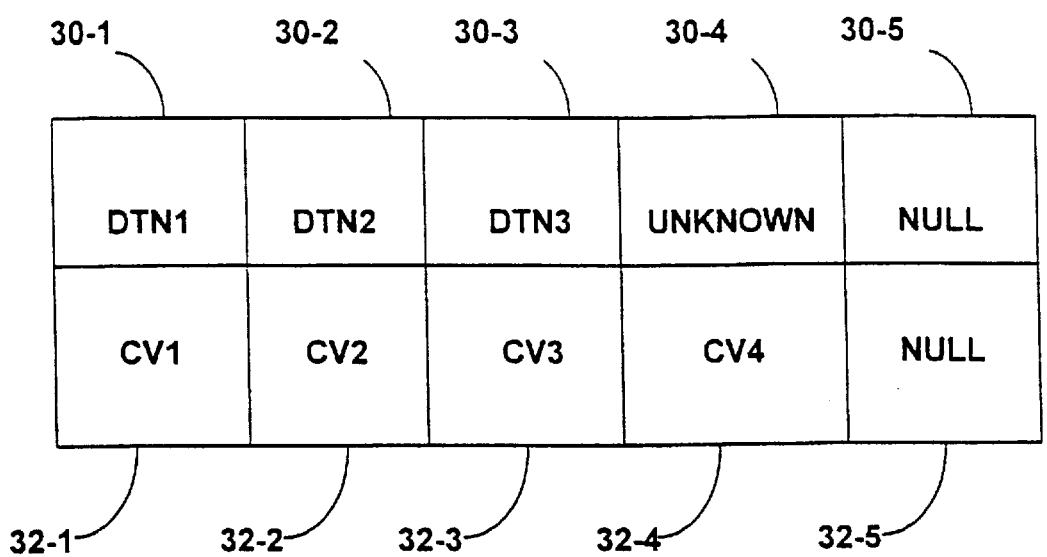
FIG. 2 shows the structure of a user subprofile of the embodiment of FIG. 1.

The user profile 24 in FIG. 2 comprises forty subprofiles 28 respectively associated with the times 0800, 0815, 0830, etcetera, up to 1745 (only one subprofile 28 being shown for convenience). Each subprofile 28 comprises two sets of stores 30 and 32. In this embodiment each set has five stores (30-1 to 30-5, and 32-1 to 32-5), but more or fewer than this can be used as appropriate, The contents of stores 30-1 to 30-5 are, respectively, DTN1, DTN2, DTN3, a code representing an unknown location for the PNU, and the NULL value (store 30-5 being unused). The contents of stores 32-1 to 32-5 are, correspondingly, confidence value (CV) 1, CV2, CV3, CV4 and the NULL value. In this example, DTN1 is the PNU's home DTN, DTN2 is the PNU's office DTN, and DTN3 is the PNU's lunch break DTN.

The CVs represent the probability of the call being successful at their DTNs, and hence the sum of the CVs is 1.

The PMS 26 notes the time of day from an internal clock (not shown), selects the corresponding subprofile 28 and then determines the DTN by selecting the store 30 having the highest CV (say CV2) and retrieving the DTN (DTN2) from the associated store 32.

The SDS 202 passes the retrieved DTN2 to the requesting SCP 16, which then commands the associated SSP 14 to route, or connect, the call to DTN2. In a first variant of this embodiment, if the call is answered at the DTN2 terminal the relevant SCP 16 sends a "call answered" signal to the PMS 26 which then deems the call successful, and if the call is not answered within a predetermined timeout the SCP 16 sends a "call not answered" signal to the PMS 26 which then deems the call abandoned and unsuccessful. The PMS 26 also notes the call as abandoned and unsuccessful in the event that it receives from the SCP 16 a "calling user disconnect" signal.

In other variants, the PNU will have a smart card containing his PN details and the network terminals will have a swipe (or insertion) mechanism for reading the card. To accept a call at a destination terminal the PNU will swipe his card and the terminal will send the details back to the PMS 26. Such an acceptance procedure is in principle the same as a registration procedure using the smart card, and verifies the PNU as the person authorised to accept the call.

Instead of using a smart card the PNU can enter the relevant information via the terminal keypad.

In more complex variants, the PMS 26 can deem a call partially successful. An example of such a situation is where the call is answered by a person other than the PNU, and that person indicates to the service, by voice or keypress, that any message from the calling user will be given to the PNU.

The PMS 26, upon receipt of the information indicating the outcome of the call, now updates the profile 24 by modifying the relevant subprofile 28. If the outcome was a success, then CV2 is increased by a predetermined amount ($\Delta$), and all the CVs are divided by ($1+\Delta$). In this way, the sum of the CVs remains at 1, i.e. the subprofile is normalised, and the effect of previous modifications is progressively reduced with each new modification.

If the call was unsuccessful, the PMS 26 will select the next highest CV and send the corresponding DTN to the relevant SCP 16 for another attempt to reach the desired PNU. In response to the first call being unsuccessful, the PMS 26 will also modify the profile by decreasing CV2 by the predetermined amount $\Delta$, and dividing all CVs by ($1+\Delta$).

The PMS 26 will also modify the profile 24 on receipt of registration information from a PNU, however, such registration, per se, is not part of the present invention. For example, suppose that the PNU is normally at home at 0800, and the subprofile for 0800 has a high CV for the home DTN and low values for all other CVs. Then suppose that the PNU changes routine, is at his office by 0800, and just after 0800 enters the appropriate PN identification information at the office DTN. The PMS 26 will modify the 0800 subprofile 28 by increasing the CV for the office DTN in the same manner as described above for responding to a successful call.

The purpose of the unused store 32-5 is to be able to respond when the PNU registers at a DTN not yet recorded in the profile, and similarly such registration is not part of the present invention. The PMS 26 will note the time of day of the new registration, select the subprofile 28 which next follows that time, write the new DTN (obtained from the calling line identity (CLI) of the terminal used by the PNU, or entered via the keypad if the PNU wishes to be registered at a terminal different from that which he is using) into store 32-5 of the selected subprofile 28, allocate the corresponding CV (CV5) the initial value of unity, write CV5 into store 30-5 of the selected subprofile 28, and amend CV1 to CV4 to zero, on the ground that at that moment the PMS 26 has 100% confidence of the PNU being at that network terminal. This action of the PMS 26 in making the registration CV unity is not limited to registration at a new network terminal, but can be applied to a registration at a network terminal whose number is already recorded in the profile, instead of increasing the CV by $\Delta$, as described above.

In this embodiment the subprofile has only five pairs of stores 30-n, 32-n, but it will be appreciated that a greater number of such pairs of stores can be provided.

In a variant, after the PMS 26 has increased the store 32 corresponding to the successful call by $\Delta$, it does not normalise by dividing all the CVs by ($1+\Delta$), but it decreases each of the other used stores 32 (i.e. not including any unused store) by $\Delta$ divided by the number of those other used stores. This technique keeps the sum of the CVs constant, provided that a CV is not allowed to exceed 100% of the sum, and that a CV is not allowed to have a negative value.

In other variants, the PMS 26 does not rely on information from the calling user indicating the success or failure of the call (attempt), but refers to an internal set of rules. For example, the first routing to DTN2 may itself be subject to a call diversion (or follow me) instruction set up in the intelligent network, and in this case the corresponding rule provides that if the diverted call is answered then the PNU is deemed to be currently at the diversion DTN, but only with a probability p of less than 1. In one of these variants, the PMS 26 increases the CV associated with the diversion DTN (after making a new entry in the store 30 if this DTN is not already one of the stored DTNs) by the amount $\Delta$ times p, and the remaining value ($1-p$) times $\Delta$ is added to CV4 (the unknown DTN, or location). In another of these variants, instead of assigning all the remaining value to the CV4, it is shared amongst the CVs, not including the CV for the diversion DTN.

In a variant, not forming part of the present invention, the PMS 26 does not modify the profile 24 immediately upon receipt of a registration, but records all registrations received up to the time of the next following subprofile, applies to the registrations a weighting function which prefers more recent registrations, and modifies the profile. In an alternative, each new registration overwrites the previous registration so that the profile is modified only in respect of the last received registration.

Whereas in FIG. 1 the PMS 26 resides in the SDS 22, it will be appreciated that alternatively the profile management functionality can be provided within the SCP 16, and the profiles 24 can be contained within a service database function associated with the SCP 16 (at a higher hierarchical level in the intelligent network 10). Furthermore, if required, the period covered by the profile can be twenty four hours, and it will be appreciated that the period covered by a subprofile can be more or less than fifteen minutes depending upon the amount of memory in the SDS 22, and that it is not necessary for all the subprofiles to cover the same period.

Figure 3:
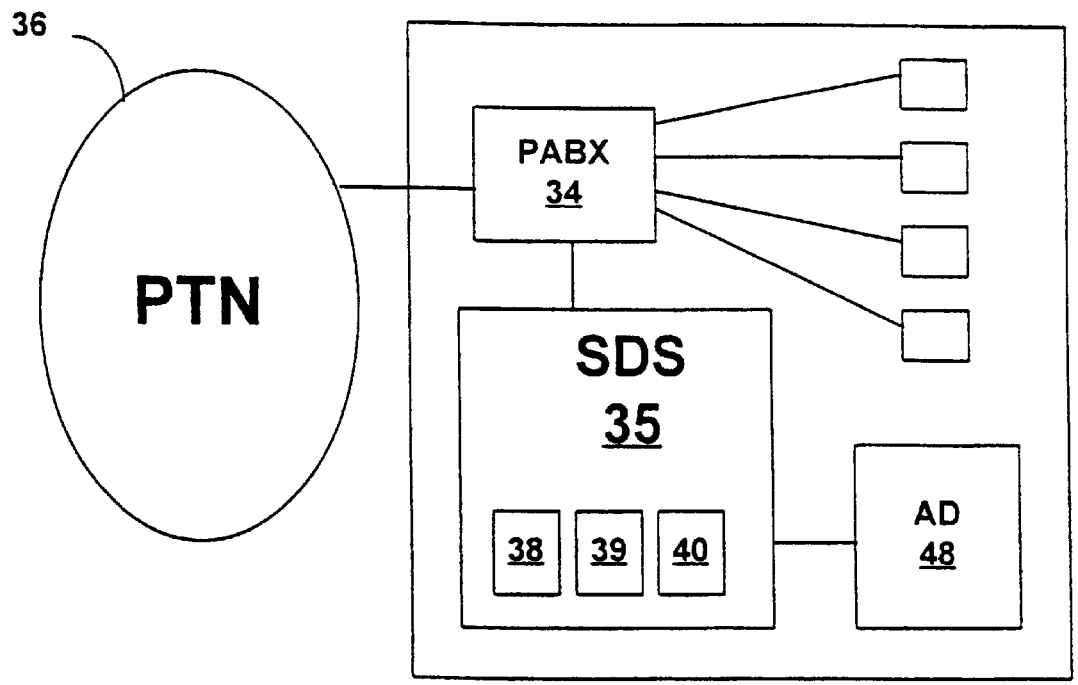
FIG. 3 shows a second form of the present invention embodied in customer premises equipment.

In another embodiment of the present invention shown in FIG. 3, a private automatic branch exchange (PABX) 34 is connected to a public telecommunications network 36 capable of providing CLI to a destination terminal on call set-up (e.g. an integrated services digital network or the intelligent network of FIG. 1) and comprises a set of customer profiles 38 (each customer profile being similar in structure to a subprofile 28 but being source-associated instead of destination-associated), a department profile 39 (similar to a PNU-associated profile 24) and a PMS 40 (similar to PMS 26).

The PABX 34 provides communications for a multiplicity of terminals in various departments of a departmental store 42, hereinafter referred to as shop 42, and thus constitutes a private network as is known in the art. The terminals of a department are arranged for group pickup.

The department profile 39 is associated with an accounts department of shop 42, and its function will be described later.

Figure 4:
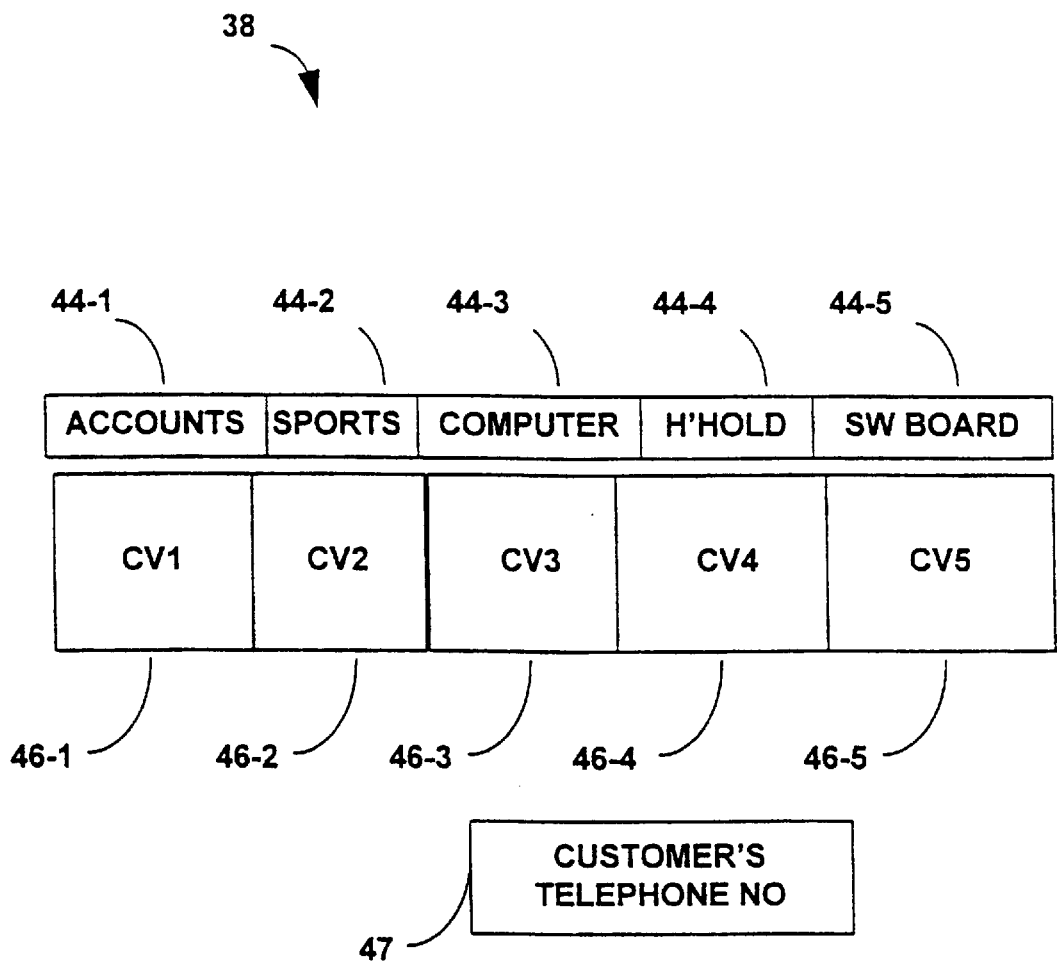
FIG. 4 shows the structure of a user profile of the embodiment of FIG. 3.

As shown in FIG. 4, each customer profile 38 comprises two sets of stores 44-1 to 44-5 and 46-1 to 46-5 (similar to stores 30 and 32), and a store 47 containing the customer's telephone number. Stores 44-1 to 44-5 contain, respectively, the PABX extension numbers of the accounts department, the sports department, the computer department, the household department, and the switchboard, and stores 46-1 to 46-5 contain associated CVs, CV1 to CV5. In reality, shop 42 would have many more departments, and the stores 44 and 46 would be correspondingly larger, but this description will be limited to the five named departments and it will be appreciated that the PMS 40 and the stores 44 and 46 can readily be modified to handle more departments.

In this embodiment the accounts department is not located at the site of the shop 42 but is located remotely and is a distributed accounts function in which people at a first office work mornings part time and people at a separate office work afternoons part time.

The PMS 40 is connected to an accounts database (AD) 48 of the shop 42, and is arranged to interrogate it at intervals, for example at 2200 each working day.

Suppose that a customer has just bought a computer, and that the customer already has an account with the shop 42. The accounts department will have entered the details of the customer and the purchase into the AD 48, and the next accounting date when the account is to be sent to the customer (let this be one week later than the date of purchase). The PMS 40 detects from an update store of the AD 48 that there is new information relating to a known customer, accesses the profiles in accordance with the customer identity, and modifies the customer's profile in accordance with an internal set of rules.

The PMS 40 increases the CV3 in accordance with a rule which is based on the premise that the customer is likely to be seeking advice concerning the computer (its set-up and operation) in the period immediately after its purchase. The increase is effected by adding a predetermined amount $\delta p$, and then dividing all CVs by $(1+\delta_p)$, i.e. a normalising procedure similar to that described for the PNU situation.

Each different type of product has a respective $\delta_p$. In the example given of a computer, $\delta_p$ would have a high value representing the likelihood that the customer would need assistance in setting up the computer and getting the applications programs to run. For a product not involving any mechanism or electrical/electronic parts, such as a duvet, the value of $\delta_p$ would be low representing the likelihood that aftersales assistance would be sought only if the product were faulty and the customer were reporting this to the relevant department. The various values of $\delta_p$ for the range of products sold by the shop 42 may be set by the administration function using its own aftersales data or using trade associations' data on product reliability, or may be set in any other suitable manner.

For this example of a computer, suppose that the customer has not made any recent purchases and has not recently been sent an account. Thus, just prior to the purchase of the computer, CV1, CV2, and CV4 will have low values and CV5 will have a high value, representing the likelihood that the next call from the customer will not be intended for a specific department but will need to be routed to the switchboard and treated as a general enquiry. The value of $\delta_p$ will be such that upon modification of the profile by PMS 40, CV3 will now be the highest CV.

Suppose now that the customer has been unsuccessful in setting up the computer or in getting the programs to run, and makes a telephone call to the single published telephone number of the shop 42 in order to seek aftersales assistance from the computer department. The network 36 interacts with the customer's telephone in known manner, obtains the CLI, provided that the customer has not invoked a network privacy function known as "CLI Withheld", and delivers the CLI when connecting the call to the PABX 34.

The PMS 40 responds to receipt of the CLI to access the customer's profile 38 by matching the CLI with the telephone number in store 47, determine that CV3 is the highest CV, read the corresponding store 44-3, and route the call to the computer department telephone group, where it will be answered by one of the assistants in that department.

In variants, the PMS 40 is associated with a data collection function (not shown) for requesting and receiving from the customer the customer's telephone number in the event that the customer's terminal, or the terminal from which the customer is making the call, is not an ISDN terminal capable of providing a CLI to the network. When the PMS 40 recognises that an incoming call from the network does not include a CLI, it invokes an announcement from a speech applications platform (SAP, not shown) of the data collection function to ask the caller to provide his own telephone number if he has an account with the shop 42. The customer can key the number using the keypad, or speak the digits, which will be recognised by the SAP. Upon receipt of data recognised as a telephone number, the data collection facility passes this to the PMS 40 which uses it to locate the relevant customer profile.

In a variant, the customer profile is associated with the customer's account number instead of his telephone number, and the customer will always need to enter his account number.

When the customer's call is answered by the computer department, the assistant will provide assistance as appropriate. If the assistant thinks it very likely that the customer's problem will not be completely solved by the assistance given and that, because he now knows the problem and the advice given, it would be better for the customer to have any further queries dealt with by him, then he may give the customer his extension number so that the customer can call him directly, should the need arise. In this case, the customer's next call will be routed by the PABX 34 to that assistant's telephone, without invoking operation of the PMS 40. If the assistant does not offer his or any other assistant's extension number, he will provide to the PMS 40 information on his opinion of the outcome (success) of his dealing with the customer's query, expressed as an outcome probability (op). The assistant will key a code including a number selected from 0, 2, 4, 6, 8 and 1, and in this case suppose that he selects the number 2 to represent his high opinion that the customer will call again (i.e. an outcome probability of 0.2, low success).

The PMS 40 will modify the customer's profile by decreasing the CV3 by an amount $\delta_p$ times op, and then dividing all the CVs by $(1-\text{op}\cdot\delta_p)$. In a variant, the PMS 40 decreases the CV3 by an amount $\delta_p$ times op, and increases all other CVs by (1−op) times $\delta_p$ divided by the number of those other CVs.

In an alternative situation, suppose that the assistant believes that he has successfully dealt with the customer's query and does not expect the customer to need to ring the computer department again. In this case the assistant will enter the code including the number 1 to indicate total success, and the PMS 40 will respond by decreasing the CV3 by $\delta_p$ (i.e. reducing CV3 to zero) and dividing all CVs by $(1-\delta_p)$, or in a variant increasing the other CVs by an equal share of $\delta_p$.

In this example of the computer purchase, the PMS 40 also notes the accounting date, i.e. the date of despatch of the account to the customer, and in accordance with a set of rules for processing CV1s, makes an entry in a diary 50 for 7 day's time followed by thirty daily entries to modify the customer's profile. When the first diary entry matures, the PMS 40 modifies the corresponding profile by increasing the CV1 by an amount $\delta_a$ and decreasing the other four CVs by $\delta_a$ divided by four. In a variant, the PMS 40 increases CV1 by $\delta_a$ and then divides all the CVs by $(1+\delta_a)$. It will be appreciated that CV1 is not modified before the time at which the customer is expected to receive his account in the ordinary course of the postal service, and the above 7 day delay means that the modification is made after the end of trading on the day of despatch of the account.

As each subsequent diary entry matures, the PMS 40 accesses the corresponding profile and decreases the CV1 by the amount (CV1 times k), where k is preferably 0.2, but may be any other suitable value. The PMS 40 also divides all CVs by (1−CV1.k). In this manner the decreasing CV1 reflects the probability that if the customer has not made a query concerning his account by that time, then it is becoming less likely that he will do so in the immediate future.

The same principle of decreasing the CV with time can be applied to the other CVs, for example for the computer purchase the CV3 could be decreased from a short time after the purchase date to reflect the likelihood that if the customer has not yet had a problem with the computer, then he will not have a problem thereafter. In the same way, the PMS 26 of the embodiment of FIG. 1 can modify the CVs with time, for example this would be useful when a PNU had not registered for a long time and the profile is required to indicate less confidence that he is still at the network terminal of the last registration.

If the customer makes a call to the shop 42 upon receipt of his account to make a query, for example the account may not show a discount offered by the sales assistant, the PMS 40 accesses the customer's profile 38, finds that CV1 has the highest value, and determines that the call must be extended to the accounts department. The PMS 40 now accesses the accounts department profile 39 and its subprofile for the current time of day, finds the highest CV, and connects the call to the corresponding group number. The PMS 40 manages the profile 39 in response to registrations by people at the two separate offices. In other words, although an office would normally be unmanned in, say, the morning, if a person wished to work a morning rather than an afternoon then the PMS 40 manages the corresponding CV to indicate a high confidence that someone is at that office.

Figure 5:
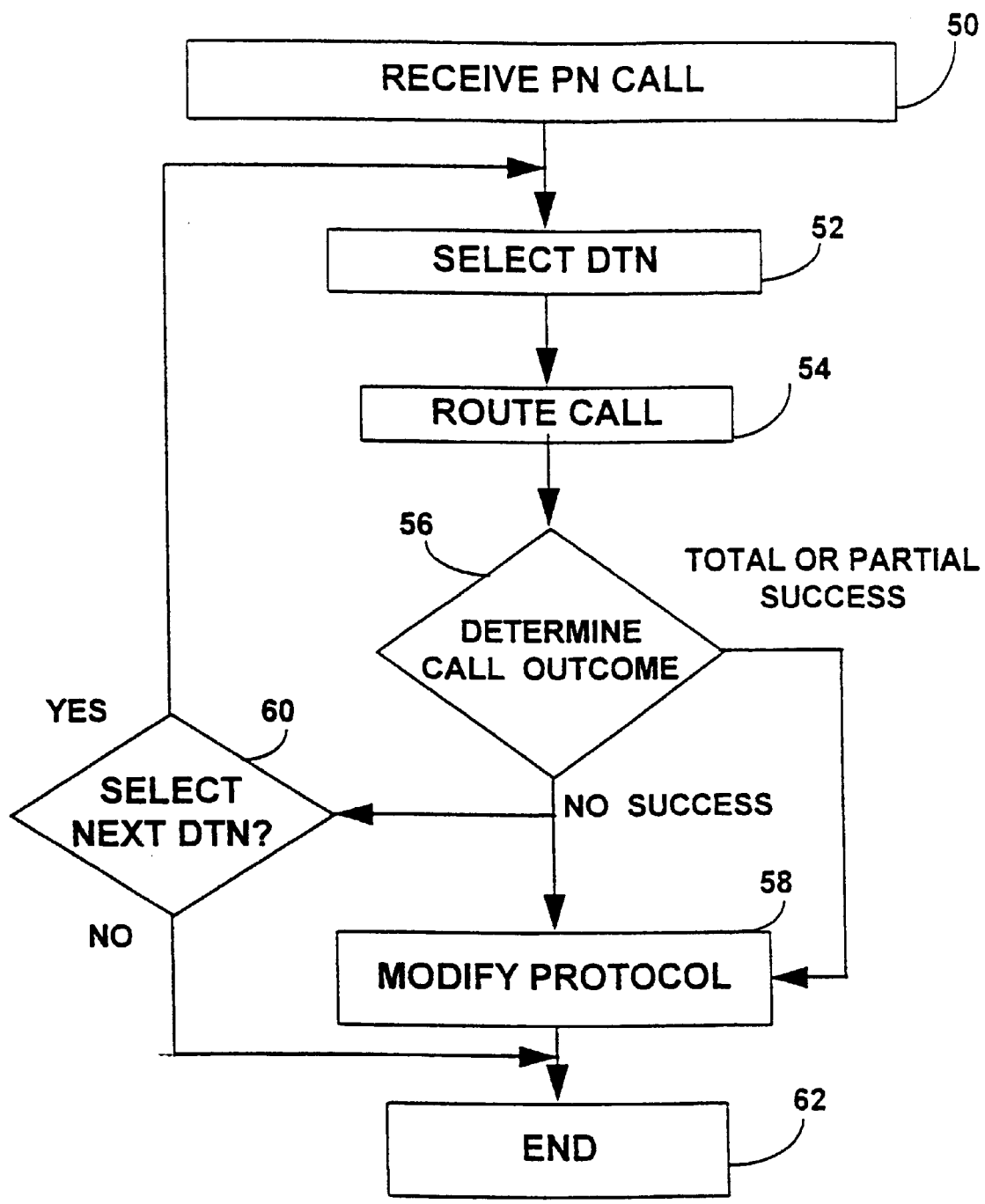
FIG. 5 shows the method steps of the operation of the embodiment of FIG. 1.

In FIG. 5, which shows the method steps of the operation of the network 10, and in particular the SDS 22, the network receives call request data relating to a called PNU in step 50, and responds in step 52 by accessing the corresponding profile and selecting the DTN having the highest confidence value. In step 54, the selected DTN is passed to the relevant SCP 16 and the call is routed to the corresponding network terminal.

In step 56, the SDS 22 receives an indication of the call outcome (alternatively, the SDS makes its own determination of the outcome), and if this is "no success" (the desired PNU is not at that network terminal) the SDS 22 proceeds to modify the corresponding profile in step 58 and to check at step 60 whether to proceed to make the next selection. If step 60 determines that no more attempts are to be made, for example this step may know if any further selections can be made or may allow only a predetermined number of attempts, then the method ends at step 62. If step 60 permits a further selection then the method returns to step 52.

If at step 56 the outcome is a total success, for example the PNU answers the call and this information is provided to the SDS 22, then the method proceeds to step 58. If the outcome is partial success, the method also moves from step 56 to step 58, but the modification of the profile reflects the uncertainty that the call, although answered, has reached the desired PNU. If desired, step 56 can have only one type of success determination, i.e. if the call is answered, then it is successful.

Figure 6:
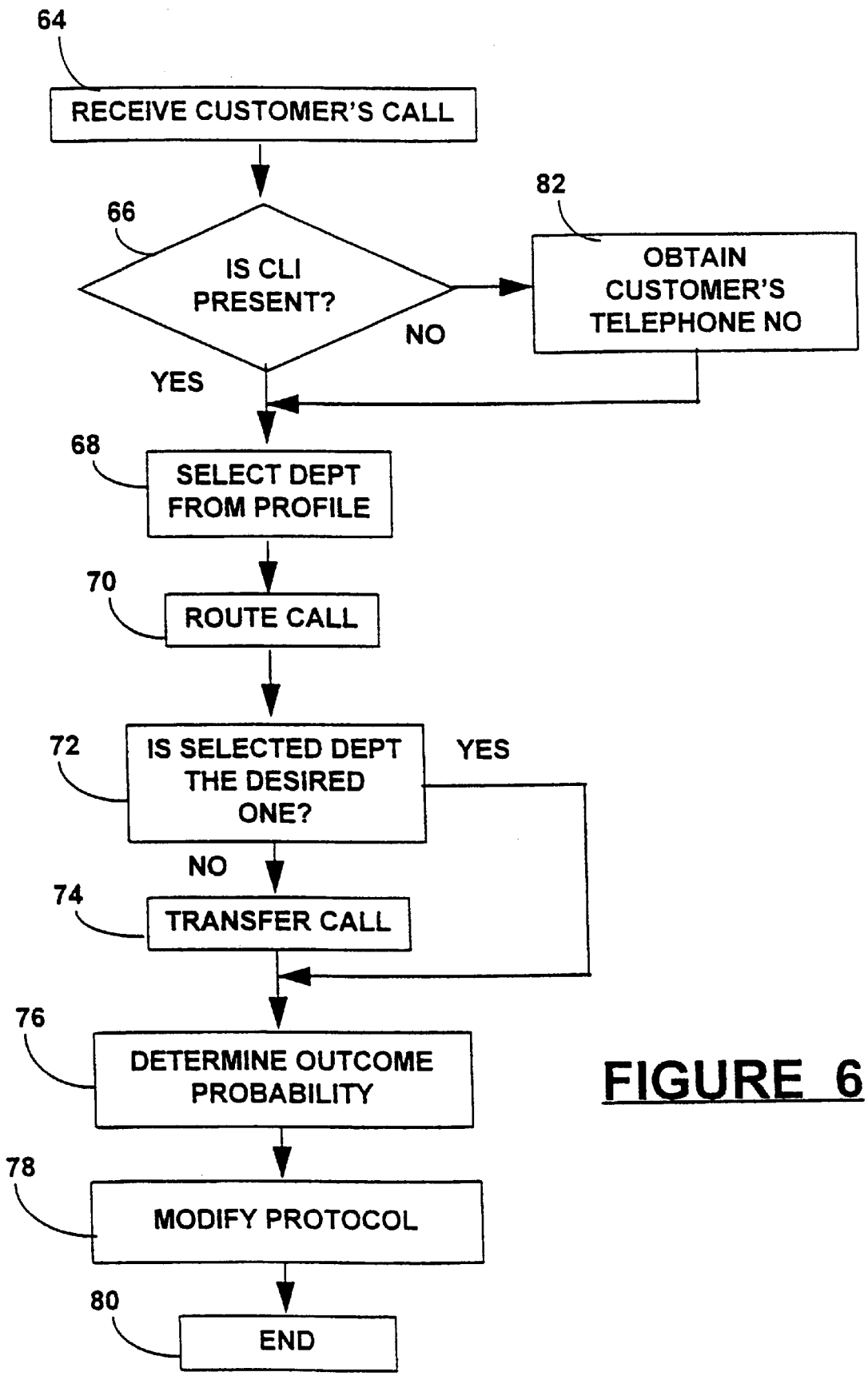
FIG. 6 shows the method steps of the operation of the embodiment of FIG. 3.

In FIG. 6, which shows the method steps of the operation of the SDS 35, a customer's call is received in step 64, and the PMS 40 checks in step 66 whether the public network has provided the CLI. If the CLI is present, the respective customer profile is accessed using the CLI and the shop department having the highest confidence value is selected from the profile in step 68. In step 70, the extension number (or group number if the department has more than one extension) is passed to the PABX 34 which routes the incoming call to the selected extension.

Upon answering the call, an assistant will first ascertain whether the call has been routed to the department desired by the customer in step 72. If the call has not been routed to the desired department, then in step 74 the assistant will transfer the call.

After the call has been routed, or transferred, to the desired department, and the enquiry dealt with, the respective assistant will in step 76 provide a value of outcome probability to the PMS 40 which will then proceed to modify the protocol in step 78 and then end at step 80.

If at step 66 the CLI is not present, the customer is requested to key his telephone number in step 82, and the method then proceeds to step 68.

If the selected department has an associated profile, such as profile 39 for the accounts department, then step 70 includes substeps corresponding to steps 52 and 54, and steps 76 and 78 are operative in relation to the profile 39.

What is claimed is:

1. A method of managing a called user-associated profile system comprising a plurality of calling user-associated profiles, each profile storing for a respective associated calling user a plurality of terminal numbers associated with the called user, and each of the terminal numbers being associated with a respective function, the called user-associated profile system being for use for determining the routing in a network for extending a call made to the called user from a said respective associated calling user, the method comprising the steps of:

storing, in each of said calling user-associated profiles, a respective confidence value in association with each of said terminal numbers, each respective confidence value representing the confidence that a call to the terminal corresponding to the associated terminal number will result in a match between a function sought by the calling user when making that call and the respective function provided by a person answering the call at that terminal;

selecting, for use by the network in routing said call, a terminal number from the said profile on the basis of the highest confidence value; and modifying at least one of said respective confidence values of the said profile on the basis of the actual outcome of a call routed to the terminal corresponding to the selected terminal number, the actual outcome representing the likelihood that the calling user will not need to make a further call seeking access to the associated function, that likelihood being determined by the person answering the call at that terminal.

2. A method as in claim 1 wherein said modifying step comprises decreasing the respective confidence value associated with said selected terminal number.

3. A method as claimed in claim 1 wherein said modifying step comprises increasing the respective confidence values associated with at least one of the terminal numbers other than said selected terminal number.

4. A method of claim 1 wherein the routing of said call is determined after the call is made.

5. A called user-associated profile system for determining the routing in a network for extending a call made to the called user associated with the profile system from a calling user associated with a profile thereof; the called user-associated profile system comprising:

a plurality of said calling user-associated profiles, each profile being arranged for association with a respective calling user and comprising a respective first storage means for storing a plurality of terminal numbers, and a respective second storage means for storing a corresponding plurality of associated confidence values, each respective confidence value representing the confidence that a call to the terminal corresponding to the associated terminal number will result in a match between a function sought by the calling user when making that call and a respective function provided by a person answering the call at that terminal;

selection means responsive to the occurrence of a said call to select from the profile associated with the calling user the terminal number having the highest confidence value; and modification means arranged to modify at least one of said respective confidence values on the basis of the actual outcome of said call routed to the terminal corresponding to the selected terminal number, the actual outcome representing the likelihood that the calling user will not need to make a further call seeking access to the associated function, that likelihood being determined by the person answering the call at that terminal.

6. A system as in claim 5 wherein the modification means is operative in response to receipt of a signal from the terminal corresponding to the selected terminal number, said signal being indicative of said likelihood and sent by the person answering the call.

7. A system as in claim 6 wherein the modification means is arranged to decrease the respective confidence value associated with said selected terminal number.

8. A system as in claim 7 wherein the modification means is also arranged to increase the respective confidence values associated with at least one of the terminal numbers other than said selected terminal number.

9. A system of claim 5 wherein the routing of said call is determined after the call is made.

10. A method of operating a personal numbering service in a network having a personal number profile system comprising a plurality of personal number-associated profiles, each profile storing for a respective personal number user of the personal numbering service a plurality of destination terminal numbers, the personal number profile system being for use for determining the routing in a network of a call to a said personal number user, the method comprising the steps of:

storing, in each of said personal number-associated profiles, a respective confidence value in association with each of said destination terminal numbers, each respective confidence value representing the confidence that a call to the terminal corresponding to the associated destination terminal number will be answered by the respective personal number user;

receiving at the network a call originated from a caller to a said personal number user;

retrieving from signalling information of that call the personal number of the called personal number user;

accessing the profile associated with that retrieved personal number;

selecting from that accessed profile, for use by the network in routing that call, a destination terminal number on the basis of the highest confidence value;

routing that call to that selected destination terminal number; and modifying at least one of said respective confidence values of said corresponding profile on the basis of the actual outcome of a call routed to the terminal corresponding to the selected destination terminal number, the actual outcome being either achieved when the call is answered, or non-achieved when there is no answer and the call is abandoned.

11. A method as in claim 10, wherein, the modifying step is performed upon receipt by the personal numbering service of authentication information provided by the person answering the call and authenticating that person as the called personal number user, and modifies said at least one of said respective confidence values on the basis that the actual outcome is fully achieved.

12. A method as in claim 10 wherein, the modifying step is performed upon receipt by the personal numbering service of information provided by the person answering the call and indicating that that person is answering as the called personal number user's representative, and modifies said at least one of said respective confidence values on the basis that the actual outcome is partially achieved.

13. A method as in claim 10 wherein, the modifying step is performed upon receipt by the personal numbering service of signalling information indicative that the call has been answered, and modifies said at least one of said respective confidence values on the basis that the actual outcome is fully achieved.

14. A method as in claim 10 wherein, when the actual outcome is at least partially achieved, and wherein the modifying step comprises increasing the confidence value associated with said selected destination terminal number.

15. A method as in claim 10 wherein, when the actual outcome is at least partially achieved and wherein the modifying step comprises decreasing the respective confidence values associated with at least one of the destination terminal numbers other than said selected destination terminal number.

16. A method as in claim 10 wherein, when the actual outcome is non-achieved, the modifying step comprises decreasing the respective confidence value associated with said selected destination terminal number.

17. A method of claim 10 wherein the modifying step is performed by a person answering the call.

18. A user profile system for use in a network for operating a personal numbering service whereby the routing of a call to a personal number user is determined by that user's associated profile, the profile system comprising:

a plurality of personal number-associated profiles, each profile being arranged for association with a respective personal number user and comprising a respective first storage means for storing a plurality of destination terminal numbers, and a respective second storage means for storing a corresponding plurality of associated confidence values, each respective confidence value representing the confidence that a call to the destination terminal corresponding to the associated destination terminal number will be answered by the personal number user;

selection means responsive to the occurrence of a said call to select from the profile associated with the personal number user the destination terminal number having the highest confidence value; and modification means arranged to modify at least one of said respective confidence values on the basis of the actual outcome of said call routed to the terminal corresponding to the selected destination terminal number, the actual outcome being either achieved when the call is answered, or non-achieved when there is no answer and the call is abandoned.

19. A system as in claim 18 wherein, when the call is answered, the actual outcome is either partially achieved when the call is answered by a person not being the called user, or fully achieved when the called user answers the call.

20. A system as in claim 19 wherein, the modification means is operative in response to receipt of a signal from the destination terminal corresponding to the selected destination terminal number, said signal being indicative of whether said actual outcome is partially achieved or fully achieved.

21. A system as in claim 18 wherein, the modification means is operative to perform modification on the basis of a fully achieved outcome in response to a successful match of authentication information received from that destination terminal with authentication information stored in the profile associated with that personal number user.

22. A system as in claim 18 wherein, the modification means is operative to perform modification on the basis of a fully achieved outcome in response to receipt of an indication that the call has been answered.

23. A system as in claim 18 wherein, the modification means is operative to perform modification on the basis of a partially achieved outcome in response to receipt of information provided by the person answering the call and indicative that that person is answering as that personal number user's representative.

24. A system as in claim 19 wherein, the modification means is responsive to receipt of a signal indicative that said actual outcome is at least partially achieved to decrease the respective confidence values associated with at least one of the destination terminal numbers other than said selected destination terminal number.

25. A system of claim 18 wherein the modification means is used by a person answering the call to modify at least one of said confidence values.

26. A user profile system for use in a network for operating a personal numbering service whereby the routing of a call to a personal number user is determined by that user's associated profile, the profile system comprising:

a plurality of personal number-associated profiles, each profile being arranged for association with a respective personal number user and comprising a respective first storage means for storing a plurality of destination terminal numbers, and a respective second storage means for storing a corresponding plurality of associated confidence values, each respective confidence value representing the confidence that a call to the destination terminal corresponding to the associated destination terminal number will be answered by the personal number user;

selection means responsive to the occurrence of a said call to select from the profile associated with the personal number user the destination terminal number having the highest confidence value; and modification means arranged to modify at least one of said respective confidence values upon receipt from the terminal corresponding to the selected destination terminal number of call outcome information indicative that the actual outcome is that said call has been achieved.

27. A system of claim 26 wherein the routing of said call is determined after the call is made.

28. A system of claim 26 wherein the modification means is used by a person answering the call to modify at least one of said confidence values.

29. A user profile system for use in a network for operating a personal numbering service whereby the routing of call to a personal number user is determined by that user's associated profile, the profile system comprising:

a plurality of personal number-associated profiles, each profile being arranged for association with a respective personal number user and comprising a respective first storage means for storing a plurality of destination terminal numbers, and a respective second storage means for storing a corresponding plurality of associated confidence values, each respective confidence value representing the confidence that a call to the destination terminal corresponding to the associated destination terminal number will be answered by the personal number user;

selection means responsive to the occurrence of a said call to select from the profile associated with the personal number user the destination terminal number having the highest confidence value; and modification means arranged to modify at least one of said respective confidence values upon receipt of a network-generated signal indicative that the actual outcome is that there is no answer and the call is abandoned.

30. A system as in claim 29 wherein said modification means is responsive to receipt of said signal to decrease the confidence value associated with said selected destination terminal number.

31. A system of claim 29 wherein the routing of said call is determined after the call is made.

32. A system of claim 29 wherein the modification means is used by a person answering the call to modify at least one of said confidence values.

* * * * *